Dec. 3, 1963    E. W. CONRAD    3,112,903
COMBINATION FUEL TANK AND RAM JET POWER PLANT
Filed May 31, 1955
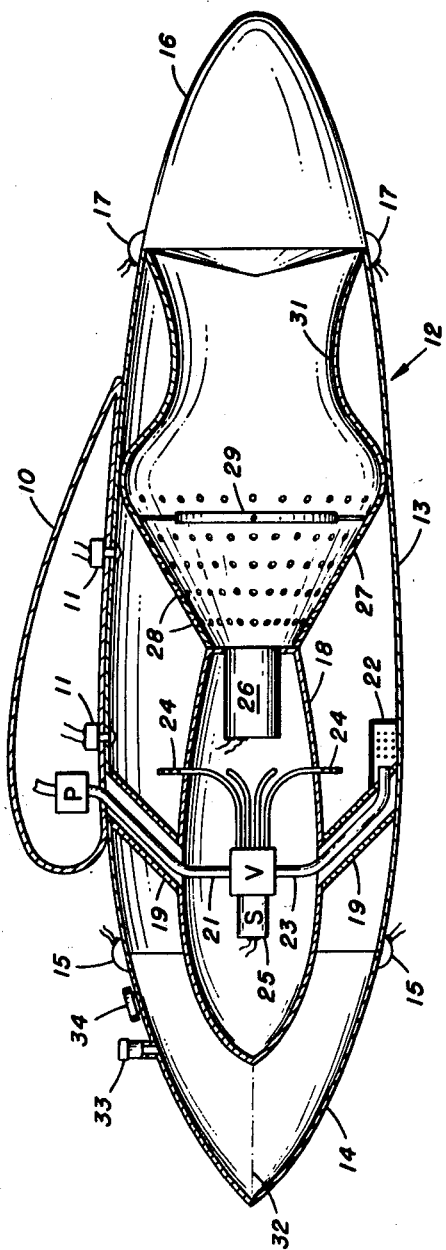
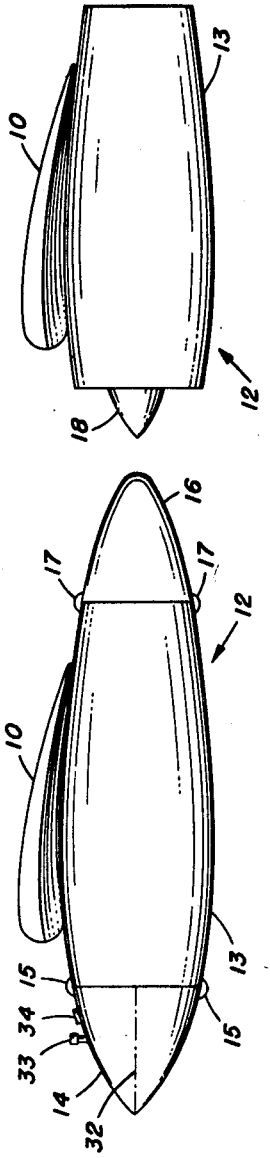
INVENTOR
EARL W. CONRAD
BY
R. J. Tompkins
ATTORNEYS

United States Patent Office 3,112,903
Patented Dec. 3, 1963

3,112,903
COMBINATION FUEL TANK AND
RAM JET POWER PLANT
Earl W. Conrad, 12550 Albion Road, Berea, Ohio
Filed May 31, 1955, Ser. No. 512,346
4 Claims. (Cl. 244—54)
(Granted under Title 35, U.S. Code (1952), sec. 266)

The invention described herein may be manufactured and used by or for the Government of the United States of America for governmental purposes without the payment of any royalties thereon or therefor.

The present invention relates to a combination fuel tank and ram jet power plant for aircraft. More particularly the invention relates to a combination fuel tank and power plant for supersonic aircraft wherein space is utilized more efficiently in such aircraft with little or no aerodynamic loss during flight and, in addition to the fuel supply carried therein, the ram jet engine is available to provide increased thrust for the aircraft when over a target or during emergency conditions. Means is provided for jettisoning nose and tail pieces forming closures at the ends of the power plant shell or casing when the fuel contained therein is either exhausted or has been transferred to the main tanks of the aircraft.

When the nose and tail pieces are jettisoned the power plant may be started and employed to provide additional thrust for the aircraft. It is also desirable to provide jettisoning means for the entire power plant to reduce aerodynamic loss and thereby to increase fuel economy, for instance, during a return trip where fuel is running low. It is, of course, understood that two or more devices of the present invention may be mounted on the wings or elsewhere on the aircraft.

An object of the present invention is to provide a combined fuel tank and ram jet engine for attachment to an aircraft wherein aerodynamic loss is maintained at a minimum.

Another object is to provide for aircraft an auxiliary ram jet power plant having a casing which may be made fluid tight to contain an auxiliary fuel supply thus to avoid the aerodynamic loss occasioned by the use of a separate power plant and a separate fuel tank.

Other objects and many of the attendant advantages of this invention will be readily appreciated as the same becomes better understood by reference to the following detailed description when considered in connection with the accompanying drawings wherein:

FIG. 1 is a side elevation of a preferred embodiment of the combined fuel tank and power plant of the present invention applied to the wing of an aircraft;

FIG. 2 is a longitudinal vertical sectional view of the device as shown in FIG. 1; and FIG. 3 is a view similar to FIG. 1 and showing the nose and tail pieces jettisoned.

Referring more particularly to the drawings wherein like numerals indicate like parts throughout the several views, 10 indicates the wing of an aircraft which may be of the supersonic type and provided, for example, with a main power plant of the turbojet type (not shown). Secured to wing 10 by quick release devices 11 is the combined fuel tank and power plant of the present invention indicated generally at 12. Quick release devices 11 may be of any well-known variety such, for example, as the type wherein an explosive charge is fired electrically by remote control, the charge acting on a locking bolt or the like which normally secures the tank and power plant 12 to wing 10 to propel the device 12 away from wing 10 thus jettisoning the device. It is, of course, clear that device 12 also may be positioned in any convenient location on the aircraft other than that heretofore described and that a plurality of devices 12 may be mounted on the aircraft.

Device 12 comprises an outer casing 13 having a nose closure 14 secured to one end thereof by quick release devices 15 similar to devices 11. A tail closure 16 is secured to the opposite end of casing 13 by quick release devices 17 which are also similar to devices 11.

Axially mounted within casing 13 is an aerodynamically shaped member 18 which is supported by radial vanes 19. A fuel conduit 21 passes through one of the vanes 19 and connects with the main fuel supply tanks of the aircraft or connects with the main power system of the aircraft. A valve V is connected to conduit 21 whereby the conduit 21 may be connected to either the sump 22 through conduit 23 when device 12 is being used as an auxiliary fuel tank or to a plurality of fuel spray members 24 when device 12 is being used as a power plant. Valve V is preferably of the remote control type and is provided with a solenoid 25 whereby the valve may be electrically operated. A reversible pump P may be mounted in conduit 21 in order to pump fuel from the device 12 through sump 22 which is located in the lower of the vanes 19 and conduit 23 to the main fuel or power system of the aircraft, or to pump fuel from the main fuel system of the aircraft to the spray members 24 when device 12 is being used as a power plant.

A fluid-tight flare 26 which may be electrically ignited is mounted in the tail portion of cone member 18 and opens into a basket type combustor 27 of conical shape. Flare 26 is provided as an igniter to avoid the use of spark plugs which may become fouled from contact with the fuel when the device is being used as a fuel tank. Combustor 27 has a plurality of perforations 28 in the walls thereof through which the fuel-air mixture passes when the device is used as a power plant and is ignited by the flare 26. A baffle plate or disc 29 is mounted in the combustor 27 in order to reduce the burner inlet velocity at ignition and is formed of magnesium or other readily burnable material whereby the plate 29 is consumed after the flame is well started in combustor 27 thus permitting full velocity of the gases therethrough. A convergent-divergent exhaust nozzle of fixed area is provided as shown at 31.

Nose closure 14 may be provided with weakened seams 32 whereby the closure 14 when jettisoned by the release device 15 will separate in directions away from adjacent structural parts of the aircraft, thus to prevent damage thereto. Closure 14 may also be provided with an air vent 33 and a fuel filler opening and cap therefor indicated at 34. Both nose closure 14 and tail closure 16 may be provided with gaskets (not shown) at the junctions thereof with the casing 13 in order to prevent leakage of fuel therefrom.

In operation one of the devices of the present invention is mounted preferably on or adjacent to the tip of each wing of the aircraft, the casing 13 being filled with fuel which is retained therein by closures 14 and 16. The various burner components mounted within the casing tend to prevent undue motion or sloshing of the fuel during flight.

A typical flight plan employing the combined gas tank and power plant of the present invention is as follows: take off acceleration to cruise Mach number, climb to cruise altitude, and cruise, all of which are performed with the main turbo jet and afterburner of the aircraft and using the fuel contained in the fuel tank and power plant device indicated at 12. Thereafter 12 being emptied of fuel, the nose and tail closures 14 and 16 are jettisoned, valve V is actuated to direct fuel to spray members 24, fuel being fed from the main fuel system of the aircraft by pump P, flare 26 is ignited causing ignition of the fuel-air mixture thus burning away baffle 29. When baffle 29 is burned away each ram jet power plant operates at full efficiency and in combination with the main turbo jet accelerates the aircraft at high Mach numbers which is particularly desirable during combat operation. Thereafter the aircraft returns to base using the main turbo jet engine with or without jettisoning the devices 12.

Obviously many modifications and variations of the present invention are possible in the light of the above teachings. It is therefore to be understood that within the scope of the appended claims the invention may be practiced otherwise than as specifically described.

What is claimed is:

1. The combination of an auxiliary fuel tank and a ram jet power plant adapted to be secured to an aircraft and comprising, a casing forming said fuel tank to initially contain fuel and forming the outer surface of said power plant and having a nose opening and a tail opening, a first closure for said nose opening, first remotely controlled quick-release means for said first closure, a second closure for said tail opening, second remotely controlled quick-release means for said second closure, an aerodynamically shaped housing axially mounted in said casing adjacent the nose opening thereof and spaced therefrom to form an air passage between said housing and said casing, a plurality of radial vanes supporting said housing in said casing, a perforated combustion chamber of substantially conical shape attached to the tail end of said housing, remotely controlled flare means mounted in said housing and communicating with said combustion chamber, a plurality of fuel spray members extending radially from said housing for forming a fuel-air mixture in said air passage, a sump member mounted in said casing, a fuel conduit entering said housing through one of said radial vanes and connected to the fuel stem of said aircraft, a remotely controlled selector valve interposed between said conduit and said sump and spray members whereby said sump and spray members may be selectively connected to said conduit for withdrawing the fuel from the casing and for feeding the fuel to the spray members, a baffle plate mounted in said combustion chamber for initially retarding the flow of combustion products when said flare ignites the fuel-air mixture in the combustion chamber, said baffle plate being formed of a flammable material whereby the plate is consumed after the fuel-air mixture is completely ignited, and a fixed convergent-divergent exhaust nozzle mounted within the tail opening of said casing.

2. A combination auxiliary fuel tank and ram jet power plant for aircraft comprising, a casing having open nose and tail portions, jettisonable closure means for selectively closing said nose and tail portions, a housing mounted in said casing adjacent the nose portion, a combustion chamber attached to the tail end of said housing, flare means mounted in said housing and communicating with said combustion chamber, fuel spray members within said casing for forming a fuel-air mixture, means for selectively withdrawing fuel from said casing before said closure means are jettisoned and for feeding fuel to said spray members after said closure means are jettisoned, means mounted in said combustion chamber for initially retarding the flow of combustion products when said flare ignites the fuel-air mixture in said combustion chamber, and an exhaust nozzle mounted in the tail portion of said casing.

3. A combination auxiliary fuel tank and ram jet power plant for aircraft comprising, a casing having open nose and tail portions, jettisonable closure means for selectively closing said nose and tail portions, a housing mounted in said casing adjacent the nose portion, a perforated combustion chamber attached to the tail end of said housing, means within said casing for forming a fuel-air mixture, means for selectively igniting the fuel-air mixture, means for selectively withdrawing fuel from said casing before said closure means are jettisoned and for feeding fuel to said fuel-air mixture forming means after said closure means are jettisoned, means in said combustion chamber for initially retarding the flow of combustion products when said fuel-air mixture is ignited in said combustion chamber, and a nozzle in the tail portion of said casing.

4. A combination auxiliary fuel tank and ram jet power plant for aircraft comprising, a casing having open nose and tail portions, jettisonable closure means for selectively closing said nose and tail portions, an aerodynamically shaped housing mounted in said casing adjacent the nose opening thereof and spaced therefrom to form an air passage between said housing and said casing, a combustion chamber of substantially conical shape attached to the tail end of said housing for forming a fuel-air mixture in said air passage, a sump member mounted in said casing, a fuel conduit extending into said casing and communicating with said sump and spray members, valve means interposed between said conduit and said sump and spray members whereby said sump and spray members may be selectively connected to said conduit for withdrawing the fuel from said casing before said closure means are jettisoned and for feeding the fuel to the spray members after said closure means are jettisoned, a baffle plate mounted in said combustion chamber for initially retarding the flow of combustion products when the fuel-air mixture is ignited in the combustion chamber, and a fixed convergent-divergent exhaust nozzle mounted within the tail opening of said casing.

References Cited in the file of this patent

UNITED STATES PATENTS

| 1,486,715 | Wood | Mar. 11, 1924 |
| 2,365,080 | Humphreys | Dec. 12, 1944 |
| 2,518,882 | Goddard | Aug. 15, 1950 |
| 2,575,534 | Stoughton | Nov. 20, 1951 |
| 2,686,473 | Vogel | Aug. 17, 1954 |
| 2,969,643 | Mullen | Jan. 31, 1961 |